(12) United States Patent
Paknad et al.

(10) Patent No.: US 8,112,406 B2
(45) Date of Patent: Feb. 7, 2012

(54) METHOD AND APPARATUS FOR ELECTRONIC DATA DISCOVERY

(75) Inventors: Deidre Paknad, Palo Alto, CA (US); Pierre Raynaud-Richard, Redwood City, CA (US); Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/963,383

(22) Filed: Dec. 21, 2007

(65) Prior Publication Data

US 2009/0165026 A1   Jun. 25, 2009

(51) Int. Cl.
G06F 17/30   (2006.01)
(52) U.S. Cl. .......................... 707/706; 707/758
(58) Field of Classification Search ............... 707/706, 707/758
See application file for complete search history.

(56) References Cited

U.S. PATENT DOCUMENTS

| | | | |
|---|---|---|---|
| 5,355,497 A | 10/1994 | Cohen-Levy | |
| 5,608,865 A * | 3/1997 | Midgely et al. .......... | 714/1 |
| 5,701,472 A | 12/1997 | Koerber et al. | |
| 5,875,431 A | 2/1999 | Heckman et al. | |
| 5,903,879 A | 5/1999 | Mitchell | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,425,764 B1 | 7/2002 | Lamson | |
| 6,539,379 B1 | 3/2003 | Vora et al. | |
| 6,607,389 B2 | 8/2003 | Genevie | |
| 6,622,128 B1 | 9/2003 | Bedell et al. | |
| 6,738,760 B1 | 5/2004 | Krachman | |
| 6,805,351 B2 | 10/2004 | Nelson | |
| 6,832,205 B1 | 12/2004 | Aragones et al. | |
| 6,839,682 B1 | 1/2005 | Blume et al. | |
| 6,944,597 B2 | 9/2005 | Callen et al. | |
| 6,976,083 B1 * | 12/2005 | Baskey et al. .......... | 709/232 |
| 7,076,439 B1 | 7/2006 | Jaggi | |
| 7,103,602 B2 | 9/2006 | Black et al. | |
| 7,104,416 B2 | 9/2006 | Gasco et al. | |
| 7,107,416 B2 | 9/2006 | Stuart et al. | |
| 7,127,470 B2 | 10/2006 | Takeya | |
| 7,162,427 B1 | 1/2007 | Myrick et al. | |
| 7,197,716 B2 | 3/2007 | Newell | |
| 7,225,249 B1 | 5/2007 | Barry et al. | |
| 7,236,953 B1 | 6/2007 | Cooper et al. | |
| 7,281,084 B1 | 10/2007 | Todd et al. | |
| 7,283,985 B2 | 10/2007 | Schauerte et al. | |
| 7,284,985 B2 | 10/2007 | Genevie | |

(Continued)

OTHER PUBLICATIONS

Human Capital Mangement; "mySAP . . . management"; retrieved from archive.org Aug. 18, 2009 www.sap.com.

(Continued)

*Primary Examiner* — Son T Hoang
(74) *Attorney, Agent, or Firm* — Shumaker & Sieffert, P.A.

(57) ABSTRACT

Removing or minimizing human participation in the collection or hold process, pursuant to electronic discovery, in a robust, fast, transparent, and legally defensible manner. A method and apparatus that ensures a robust and defensible way of communicating electronic discovery collection and hold requests from electronic discovery management systems to disparate data sources in a uniform way.

26 Claims, 14 Drawing Sheets

U.S. PATENT DOCUMENTS

| | | | |
|---|---|---|---|
| 7,333,989 B1* | 2/2008 | Sameshima et al. | 707/770 |
| 7,386,468 B2 | 6/2008 | Calderaro et al. | |
| 7,433,832 B1 | 10/2008 | Bezos et al. | |
| 7,478,096 B2 | 1/2009 | Margolus et al. | |
| 7,496,534 B2 | 2/2009 | Olsen et al. | |
| 7,502,891 B2 | 3/2009 | Shachor | |
| 7,512,636 B2 | 3/2009 | Verma et al. | |
| 7,558,853 B2 | 7/2009 | Alcorn et al. | |
| 7,580,961 B2 | 8/2009 | Todd et al. | |
| 7,594,082 B1 | 9/2009 | Kilday et al. | |
| 7,596,541 B2 | 9/2009 | deVries et al. | |
| 7,720,825 B2 | 5/2010 | Pelletier et al. | |
| 7,730,148 B1* | 6/2010 | Mace et al. | 709/206 |
| 7,895,229 B1 | 2/2011 | Paknad | |
| 2001/0053967 A1 | 12/2001 | Gordon et al. | |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |
| 2002/0035480 A1 | 3/2002 | Gordon et al. | |
| 2002/0083090 A1 | 6/2002 | Jeffrey et al. | |
| 2002/0091553 A1 | 7/2002 | Callen et al. | |
| 2002/0095416 A1* | 7/2002 | Schwols | 707/10 |
| 2002/0103680 A1 | 8/2002 | Newman | |
| 2002/0108104 A1 | 8/2002 | Song et al. | |
| 2002/0119433 A1 | 8/2002 | Callender | |
| 2002/0120859 A1 | 8/2002 | Lipkin et al. | |
| 2002/0123902 A1 | 9/2002 | Lenore et al. | |
| 2002/0143595 A1 | 10/2002 | Frank et al. | |
| 2002/0143735 A1 | 10/2002 | Ayi et al. | |
| 2002/0147801 A1 | 10/2002 | Gullotta et al. | |
| 2002/0162053 A1* | 10/2002 | Os | 714/38 |
| 2002/0178138 A1 | 11/2002 | Ender et al. | |
| 2002/0184068 A1 | 12/2002 | Krishnan et al. | |
| 2002/0184148 A1 | 12/2002 | Kahn et al. | |
| 2003/0004985 A1 | 1/2003 | Kagimasa et al. | |
| 2003/0014386 A1 | 1/2003 | Jurado | |
| 2003/0018520 A1 | 1/2003 | Rosenfeld et al. | |
| 2003/0031991 A1 | 2/2003 | Genevie | |
| 2003/0033295 A1 | 2/2003 | Adler et al. | |
| 2003/0036994 A1* | 2/2003 | Witzig et al. | 705/38 |
| 2003/0046287 A1 | 3/2003 | Joe | |
| 2003/0051144 A1 | 3/2003 | Williams | |
| 2003/0069839 A1 | 4/2003 | Whittington et al. | |
| 2003/0074354 A1 | 4/2003 | Lee et al. | |
| 2003/0097342 A1 | 5/2003 | Whittington | |
| 2003/0110228 A1 | 6/2003 | Xu et al. | |
| 2003/0139827 A1 | 7/2003 | Phelps | |
| 2003/0229522 A1 | 12/2003 | Thompson et al. | |
| 2004/0002044 A1 | 1/2004 | Genevie | |
| 2004/0019496 A1 | 1/2004 | Angle et al. | |
| 2004/0034659 A1 | 2/2004 | Steger | |
| 2004/0039933 A1 | 2/2004 | Martin et al. | |
| 2004/0060063 A1 | 3/2004 | Russ et al. | |
| 2004/0068432 A1 | 4/2004 | Meyerkopf et al. | |
| 2004/0088283 A1 | 5/2004 | Lissar et al. | |
| 2004/0088332 A1 | 5/2004 | Lee et al. | |
| 2004/0088729 A1 | 5/2004 | Petrovic et al. | |
| 2004/0103284 A1 | 5/2004 | Barker | |
| 2004/0133573 A1* | 7/2004 | Miloushev et al. | 707/8 |
| 2004/0138903 A1 | 7/2004 | Zuniga | |
| 2004/0143444 A1 | 7/2004 | Opsitnick et al. | |
| 2004/0187164 A1 | 9/2004 | Kandasamy et al. | |
| 2004/0193703 A1 | 9/2004 | Loewy et al. | |
| 2004/0204947 A1 | 10/2004 | Li et al. | |
| 2004/0215619 A1* | 10/2004 | Rabold | 707/10 |
| 2004/0260569 A1 | 12/2004 | Bell et al. | |
| 2005/0060175 A1 | 3/2005 | Farber et al. | |
| 2005/0071251 A1 | 3/2005 | Linden et al. | |
| 2005/0074734 A1 | 4/2005 | Randhawa | |
| 2005/0114241 A1 | 5/2005 | Hirsch et al. | |
| 2005/0144114 A1 | 6/2005 | Ruggieri et al. | |
| 2005/0165734 A1 | 7/2005 | Vicars et al. | |
| 2005/0187813 A1 | 8/2005 | Genevie | |
| 2005/0203821 A1 | 9/2005 | Petersen et al. | |
| 2005/0240578 A1 | 10/2005 | Biederman et al. | |
| 2006/0036464 A1 | 2/2006 | Cahoy et al. | |
| 2006/0036649 A1 | 2/2006 | Simske et al. | |
| 2006/0074793 A1 | 4/2006 | Hibbert et al. | |
| 2006/0095421 A1 | 5/2006 | Nagai et al. | |
| 2006/0126657 A1* | 6/2006 | Beisiegel et al. | 370/465 |
| 2006/0136435 A1 | 6/2006 | Nguyen et al. | |
| 2006/0143248 A1* | 6/2006 | Nakano et al. | 707/204 |
| 2006/0149735 A1 | 7/2006 | DeBie et al. | |
| 2006/0156381 A1 | 7/2006 | Motoyama | |
| 2006/0167704 A1 | 7/2006 | Nicholls et al. | |
| 2006/0174320 A1 | 8/2006 | Maru et al. | |
| 2006/0184718 A1 | 8/2006 | Sinclair | |
| 2006/0229999 A1 | 10/2006 | Dodell et al. | |
| 2006/0230044 A1 | 10/2006 | Utiger | |
| 2007/0016546 A1 | 1/2007 | DeVorchik et al. | |
| 2007/0048720 A1 | 3/2007 | Billauer | |
| 2007/0061156 A1 | 3/2007 | Fry et al. | |
| 2007/0061157 A1 | 3/2007 | Fry et al. | |
| 2007/0078900 A1 | 4/2007 | Donahue | |
| 2007/0099162 A1 | 5/2007 | Sekhar | |
| 2007/0100857 A1 | 5/2007 | DeGrande et al. | |
| 2007/0112783 A1 | 5/2007 | McCreight et al. | |
| 2007/0156418 A1 | 7/2007 | Richter et al. | |
| 2007/0162417 A1 | 7/2007 | Cozianu et al. | |
| 2007/0208690 A1* | 9/2007 | Schneider et al. | 707/2 |
| 2007/0219844 A1 | 9/2007 | Santorine et al. | |
| 2007/0220435 A1 | 9/2007 | Sriprakash et al. | |
| 2007/0271517 A1 | 11/2007 | Finkelman et al. | |
| 2007/0282652 A1 | 12/2007 | Childress et al. | |
| 2007/0288659 A1 | 12/2007 | Zakarian et al. | |
| 2008/0033904 A1 | 2/2008 | Ghielmetti et al. | |
| 2008/0034003 A1 | 2/2008 | Stakutis et al. | |
| 2008/0059265 A1 | 3/2008 | Biazetti et al. | |
| 2008/0059543 A1 | 3/2008 | Engel | |
| 2008/0070206 A1 | 3/2008 | Perilli | |
| 2008/0148346 A1 | 6/2008 | Gill et al. | |
| 2008/0195597 A1 | 8/2008 | Rosenfeld et al. | |
| 2008/0229037 A1 | 9/2008 | Bunte et al. | |
| 2008/0294674 A1 | 11/2008 | Reztlaff et al. | |
| 2008/0301207 A1 | 12/2008 | Demarest et al. | |
| 2008/0319958 A1* | 12/2008 | Bhattacharya et al. | 707/4 |
| 2008/0319984 A1 | 12/2008 | Proscia et al. | |
| 2009/0037376 A1 | 2/2009 | Archer et al. | |
| 2009/0043625 A1 | 2/2009 | Yao | |
| 2009/0106815 A1 | 4/2009 | Brodie et al. | |
| 2009/0119677 A1* | 5/2009 | Stefansson et al. | 719/313 |
| 2009/0150866 A1 | 6/2009 | Schmidt | |
| 2009/0150906 A1 | 6/2009 | Schmidt et al. | |
| 2009/0193210 A1 | 7/2009 | Hewett et al. | |
| 2010/0070315 A1 | 3/2010 | Lu et al. | |

OTHER PUBLICATIONS

Zhu, et al.; "Query Expansion Using Web Access Log Files"; Lecture Notes in Computer Science, 2005, vol. 3588/2005, pp. 686-695, Springer-Verlag Berlin Hedelberg.

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Preservation Benchmarks for 2007 and Beyond, www.pss-systems.com, pp. 1-3 (2007).

PSS Sytems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

www.pss-systems.com; retrieved from www. Archive.org any linkage dated Dec. 8, 2005, 131 pages.

PSS Systems, Inc., Litigation Communications and Collections, www.pss-systems.com (2006), retrieved online on Dec. 8, 2010 from archive.org, 1 page.

* cited by examiner

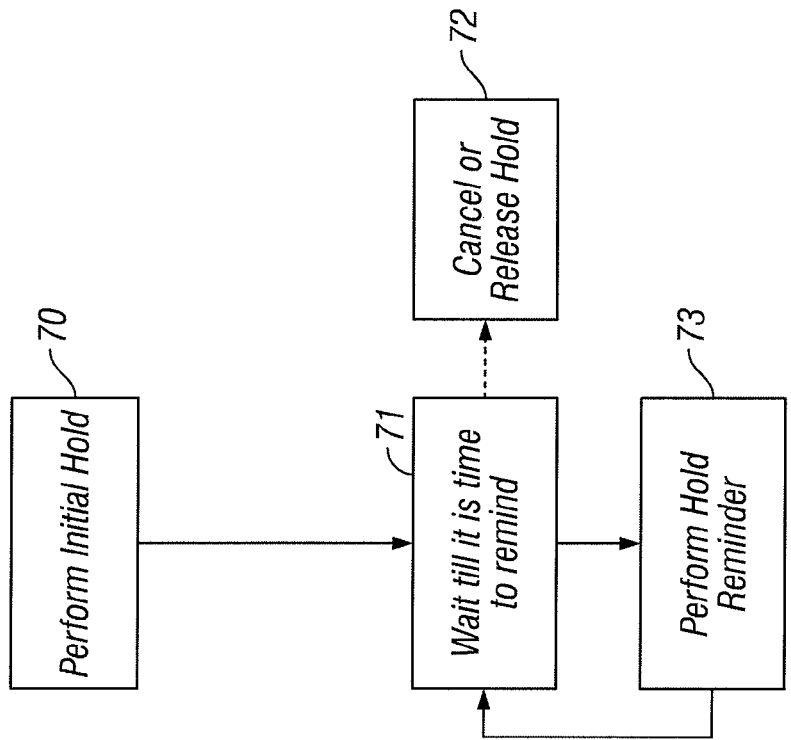
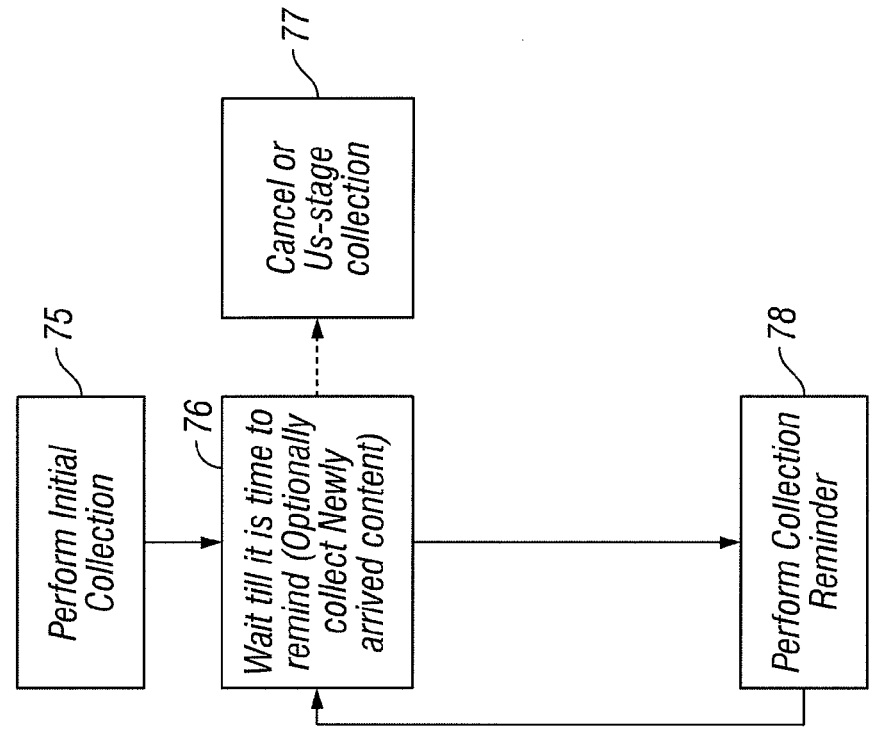
FIG. 7B
FIG. 7A

Fill in collection request parameters

Collection process limitations:
There is a chance that the Connector will not be able to collect files that were created and immediately destroyed between two subsequent Collection (Collection Reminder) Requests. For example:
-First collection request was issued and processed on 10/01/2007
-Then a collection reminder was issued and processed on 10/03/2007
-Files that were created and immediately deleted on 10/02/2007 will not be collected

Query template limitations:
Hidden files will not be found by the Connector

File Name: [ * ]
File extension: [ * ]
Modified date from: [    ]
Modified date to: [    ]

[ Validate ]

*FIG. 12*

You've got a service request

ID: 124224

Description: Please collect files describing XYZ security practices from Server 23. See query parameters below Parameters:

File name pattern: n/a

Modified date from: 1975-01-01

Modified date to: 2007-12-12

Status: | Open ▼ | Change

*FIG. 14*

METHOD AND APPARATUS FOR ELECTRONIC DATA DISCOVERY

BACKGROUND OF THE INVENTION

1. Technical Field

The invention relates to system integration in electronic data discovery. More particularly, the invention relates to a method and apparatus for communicating and managing automatic electronic data discovery collections and holds from electronic discovery management systems to disparate data sources in a uniform way.

2. Description of the Prior Art

Electronic discovery, also referred to as e-discovery or EDiscovery, concerns discovery in civil litigation, as well as tax, government investigation, and criminal proceedings, which deals with information in electronic form. In this context, electronic form is the representation of information as binary numbers. Electronic information is different from paper information because of its intangible form, volume, transience, and persistence. Also, electronic information is usually accompanied by metadata, which is rarely present in paper information. Electronic discovery poses new challenges and opportunities for attorneys, their clients, technical advisors, and the courts, as electronic information is collected, reviewed, and produced. Electronic discovery is the subject of amendments to the Federal Rules of Civil Procedure which are effective Dec. 1, 2006. In particular, for example, but not by way of limitation, Rules 16 and 26 are of interest to electronic discovery.

Examples of the types of data included in e-discovery include e-mail, instant messaging chats, Microsoft Office files, accounting databases, CAD/CAM files, Web sites, and any other electronically-stored information which could be relevant evidence in a law suit. Also included in e-discovery is raw data which forensic investigators can review for hidden evidence. The original file format is known as the native format. Litigators may review material from e-discovery in any one or more of several formats, for example, printed paper, native file, or as TIFF images.

Currently, automatic propagation of collection requests, i.e. the process of collecting the data from data sources, and hold requests, i.e. the process when a data source is instructed to preserve certain data, from electronic discovery management systems to data sources is an emerging area in which standards and best practices have not been established. Current approaches to EDiscovery are expensive due to the repeated manual steps and processes. Also, there is no well established and agreed upon understanding of how automatic propagation of collection and hold requests can be accomplished in a way that is both robust and defensible. For example, evidence may be spoiled due to misuse or overhandling. Further, it is often necessary to repeat discovery due to the poor integrity afforded by current approaches.

For example, currently collections are performed in the following way:

A collection specialist receives a collection notice, which is a human-readable instruction typically sent by email.

The collection specialist uses a collection tool, such as search engine or forensic evidence collection software, to first search and identify, and then collect relevant content.

Then, the collection specialist can upload the collected content into an electronic discovery management system. Although, more typically, information is stored on a file share or CD/DVD.

It would be advantageous to remove or minimize human participation in the collection or hold process and to do so in a robust, fast, transparent, and legally defensible manner.

It would also be advantageous to upload and track all of the information collected in an evidence inventory management system, as well as from data sources to discovery management systems.

It would also be advantageous to provide a robust and defensible way of communicating electronic discovery collection and hold requests from electronic discovery management systems to data sources, as well as from data sources to discovery management systems.

SUMMARY OF THE INVENTION

The presently preferred embodiment of the invention provides a method and apparatus that removes or minimizes human participation in the collection or hold process, and that does this in a robust, fast, transparent, and legally defensible manner.

The presently preferred embodiment of the invention also provides a method and apparatus that ensures a robust and defensible way of communicating electronic discovery collection and hold requests from electronic discovery management systems to disparate data sources in a uniform way.

BRIEF DESCRIPTION OF THE DRAWINGS

FIG. 7 provides two flow charts showing the collection process with reminders (FIG. 7b) and hold process with reminders (FIG. 7a) according to the invention;

FIG. 12 is a UI screen shot showing limitations of the connector implementation according to the invention;

FIG. 14 is a screen shot showing a sample UI for a service ticket according to the invention.

DETAILED DESCRIPTION OF THE INVENTION

The presently preferred embodiment of the invention provides a method and apparatus that removes or minimizes human participation in the collection or hold process, and that does this in a robust, fast, transparent, and legally defensible manner.

The presently preferred embodiment of the invention also provides a method and apparatus that ensures a robust and defensible way of communicating electronic discovery collection and hold requests from electronic discovery management systems to disparate data sources in a uniform way.

Terms

For purposes of the discussion herein, the following terms have the meaning associated therewith:

Electronic Data Discovery (e-discovery or EDiscovery) is discovery of electronically stored evidence in civil litigation, as well as tax, government investigation, and criminal proceedings.

Data Source. Any information system that contains data relevant for EDiscovery. Examples are: a file system containing individual document files, a content management system, a transactional data driven application, an email server, an email archive, etc.

Collection. The process of collecting the data from Data Sources.

Hold (or Hold In Place). The process when a Data Source is instructed to preserve certain data, and to prevent modification or deletion of it.

EDiscovery Management Application (EMA). A software program responsible for managing Collections and Holds, which communicates collection and hold requests to Data Sources, and which collects content from Data Sources, and which manages an inventory of collected data.

Automatic Collection/Hold Component Model

Figure 1:
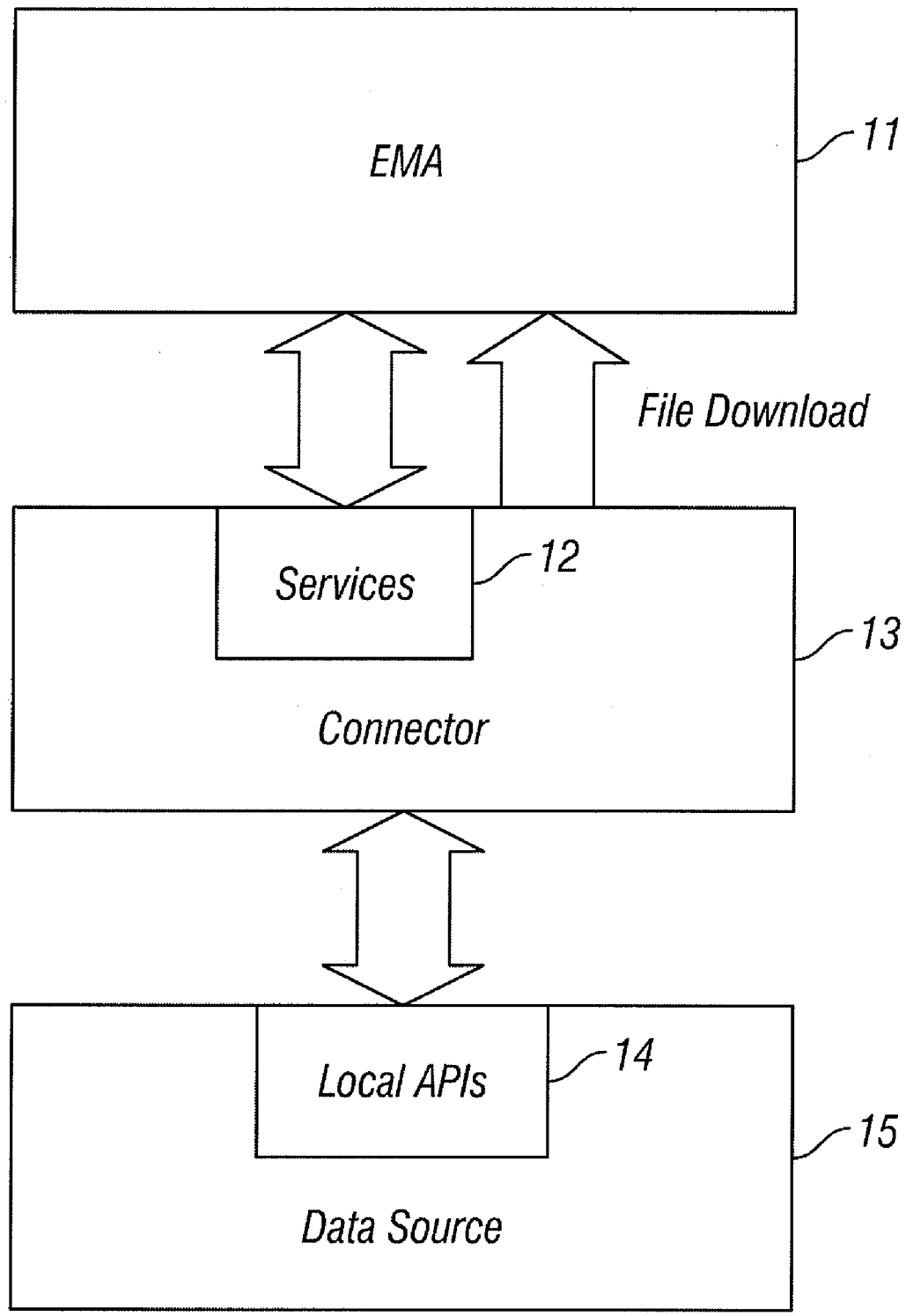
FIG. 1 is a block schematic diagram of a component model according to the invention.

The description below describes a presently preferred architecture for the invention, comprising the following components (see FIG. 1):

The EMA 11 communicates with the Connector 13 by calling connector Services 12, which may be Web Services, Structured HTTP requests, local or remote procedure calls, etc. For purposes of the discussion herein, the terms "service" and "service request" identify a communication call between the EMA and the Connector. In a practical application of the invention a Service, as described herein, does not necessarily map to a single Web Service because multiple different types of service calls may be wrapped as multiple methods of the same Web Service.

The Connector performs operations on the Data Source 15 by using whatever interface, i.e. local API 14, is provided by the Data Source.

The Connector can be an independent piece of software or can be a part of the Data Source or the EMA.

Communication Model

There are two major communication models in the presently preferred embodiment of the invention with regard to the direction of communication requests:

Uni-directorial, when all service calls are initiated by the EMA, and the Connector only responds to service calls; and Bi-directorial, where the Connector can also initiate service calls to the EMA.

The invention herein disclosed generally applies to both communication models, unless the opposite is specifically noted.

Uni-Directorial Collection

Figure 2:
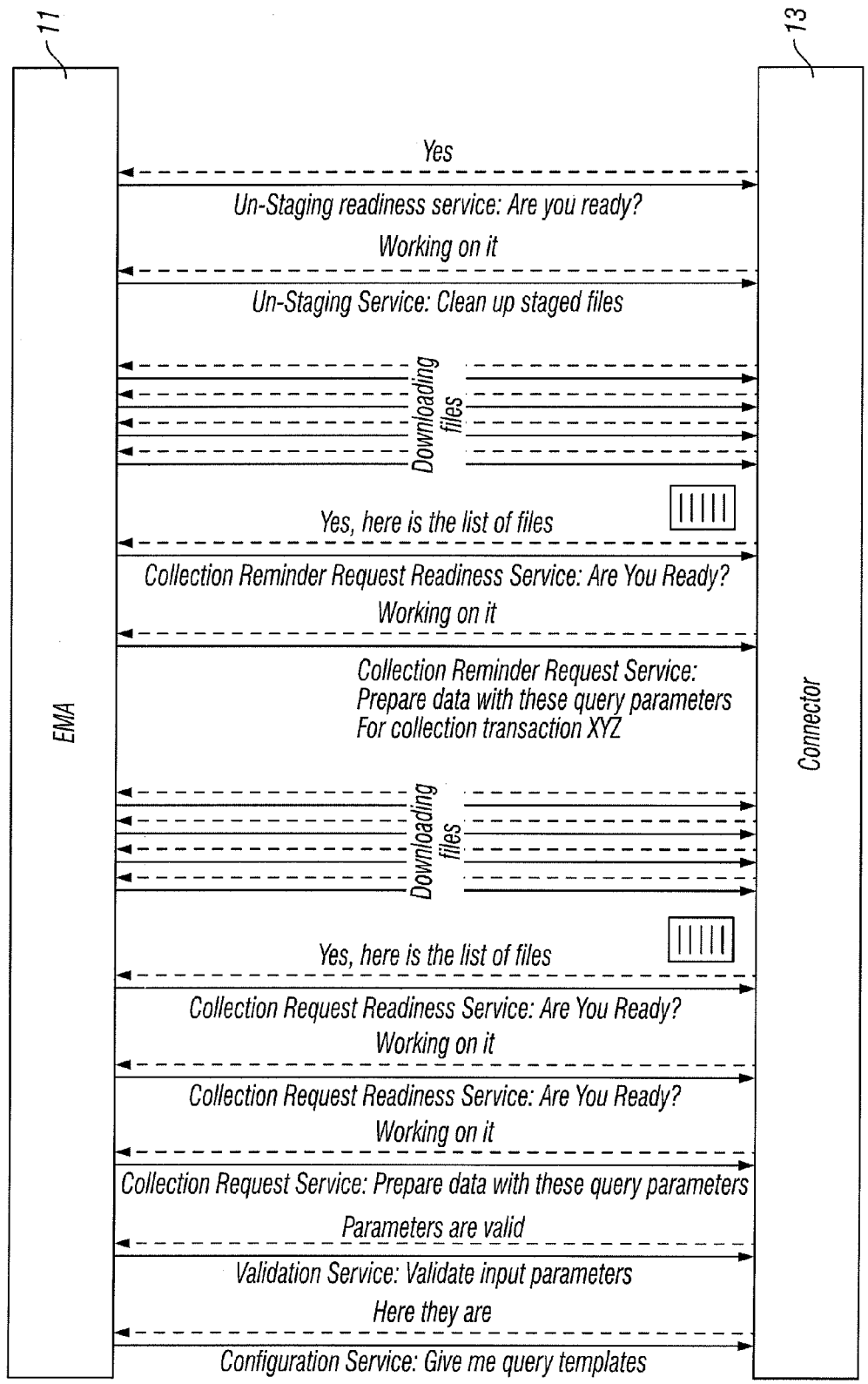
FIG. 2 is an architectural flow diagram of a uni-directorial collection communication according to the invention.

The following services are required for uni-directorial collection communication. In particular, reference should be made to FIG. 2, which is an architectural flow diagram showing uni-directorial collection communication, in which process flow proceeds between the EMA 11 and the Connector 13 over time from left to right as indicated by the arrows on each exchange of information represented by a solid or dashed line.

Configuration service—the EMA requests configuration information from the Connector. Such information may contain query templates, information on a subset of services supported by a connector, information on versions of services supported by a connector, information on preservation capabilities of a Data Source/Connector, and/or information of limitations on a connector implementation, as described below.

Validation service (optional)—the EMA sends proposed values of query parameters to the Connector, and the Connector validates these parameters and replies with an error description when the parameter values are invalid.

Collection Request Service—the EMA instructs the Connector to start a collection based upon provided query parameters. The Connector responds with an acknowledgement, collection information, or an error message.

Collection Request Readiness Service (optional)—the EMA checks whether the Connector is ready with the content to download. The Connector responds with an acknowledgement, collection information, or an error message.

Collection Reminder Request Service (optional)—the EMA instructs Connector to update an existing collection with newly arrived content. The Connector responds with an acknowledgement, collection information or an error message.

Collection Reminder Request Readiness Service (optional)—the EMA checks whether the Connector is ready with the content to download. The Connector responds with an acknowledgement, collection information, or an error message.

Un-staging Service—once the EMA has downloaded collected content, the EMA calls the un-staging service to indicate that the Connector may dispose of transient information needed to perform a collection transaction. The Connector responds with an acknowledgement, completion message, or an error message.

Un-staging Readiness Service (optional)—the EMA checks whether the Connector finished the un-staging process. The Connector responds with an acknowledgement, completion message, or an error message.

Services are called in the particular sequence which constitutes a Collection or Hold Transaction. Some service calls are optional, depending upon configuration of the Connector and results of previous calls; details will be apparent from the discussion below.

Uni-Directorial Hold Transactions

Figure 3:
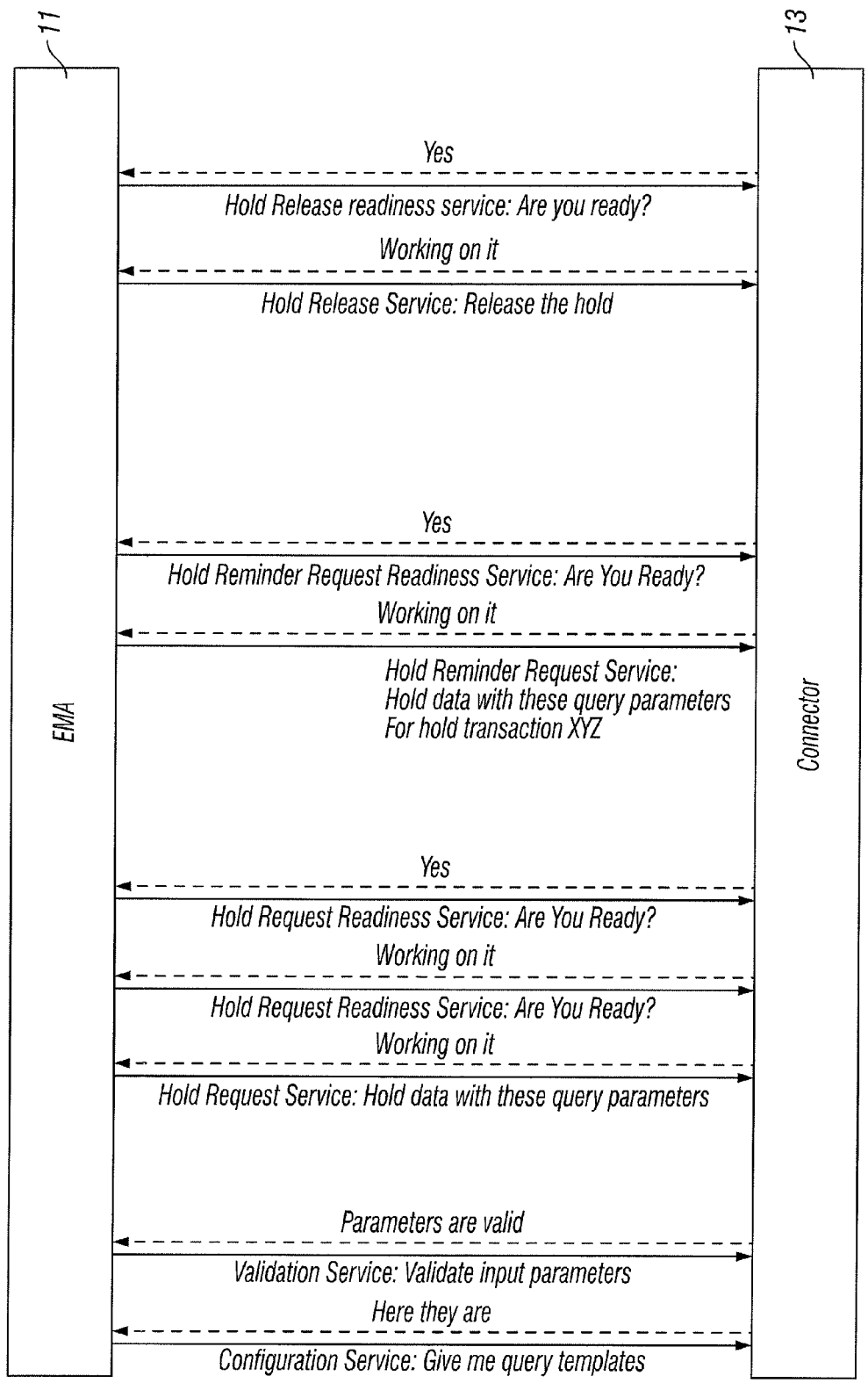
FIG. 3 is an architectural flow diagram of a uni-directorial hold communication according to the invention.

The following services are required for uni-directorial Hold transactions. In particular, reference should be made to FIG. 3, which is an architectural flow diagram showing uni-directorial hold communication, in which process flow proceeds between the EMA 11 and the Connector 13 over time from left to right as indicated by the arrows on each exchange of information represented by a solid or dashed line.

Configuration service—as described above.

Validation service (optional)—as described above.

Hold Request Service—the EMA instructs the Connector to start a hold based upon provided query parameters. The Connector responds with an acknowledgement, hold information, or an error message.

Hold Request Readiness Service (optional)—the EMA checks whether the Connector completed performing the hold. The Connector responds with an acknowledgement, hold information, or an error message.

Hold Reminder Request Service (optional)—the EMA instructs the Connector to update an existing hold with newly arrived content matching query criteria. The Connector responds with an acknowledgement, hold information, or an error message.

Hold Reminder Request Readiness Service (optional)—the EMA checks whether the Connector completed executing a hold reminder request. The Connector responds with an acknowledgement, hold information, or an error message.

Hold Release Service—When a hold is not needed any more, the EMA calls this service to indicate that the Connector may release the data on hold. The Connector starts a hold release process and responds with an acknowledgement, completion message, or an error message.

Hold Release Readiness Service (optional)—the EMA checks whether the Connector finished a hold release process. The Connector responds with an acknowledgement, completion message, or an error message.

The services are called in a sequence, which constitutes a Hold transaction. Some services are optional.

Bi-Directorial Collection Transactions

Figure 4:
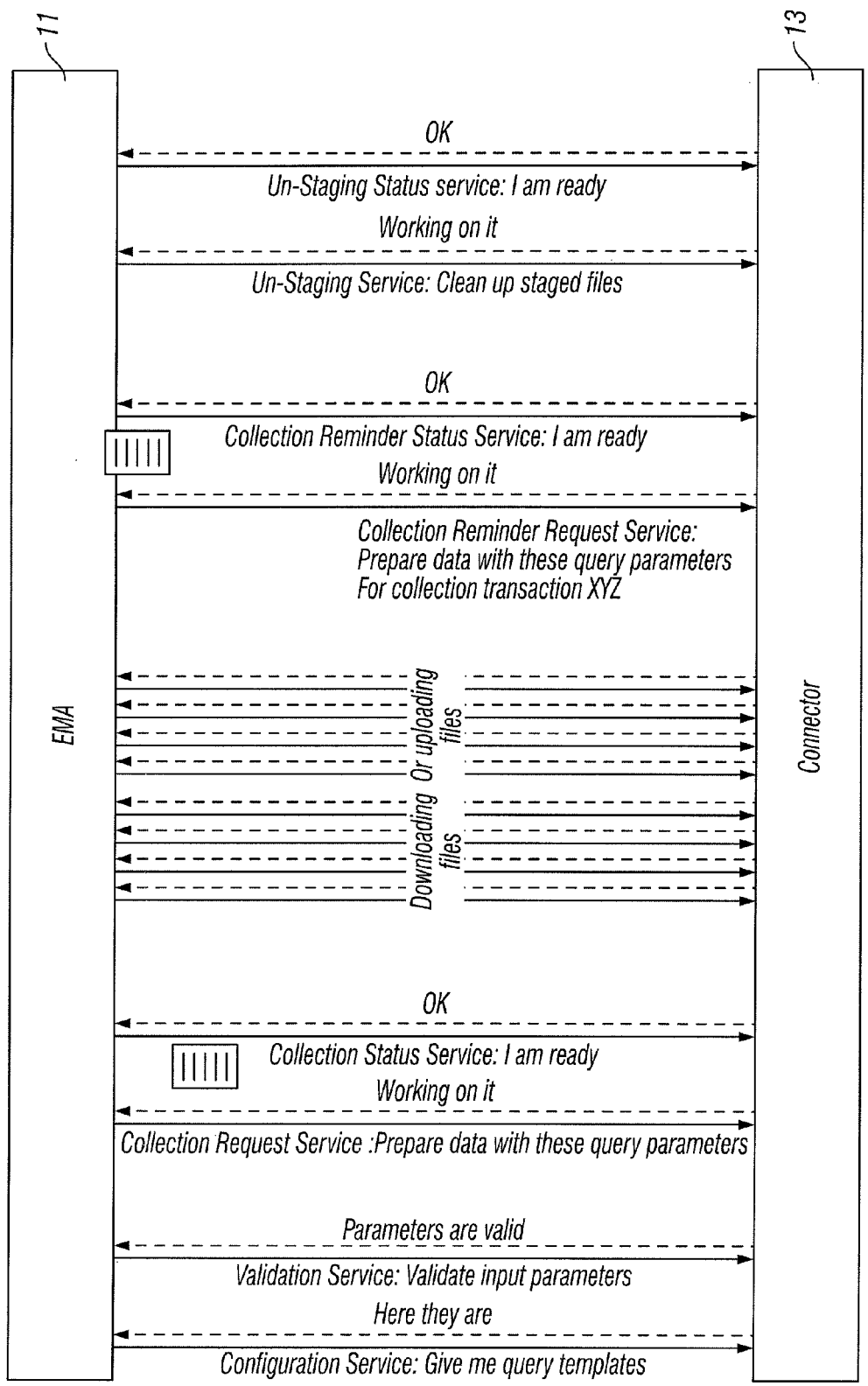
FIG. 4 is an architectural flow diagram of a bi-directorial collection communication according to the invention.

The following services are required for Bi-directional collection transactions. In particular, reference should be made to FIG. 4, which is an architectural flow diagram showing bi-directional collection communication, in which process flow proceeds between the EMA 11 and the Connector 13 over time from left to right as indicated by the arrows on each exchange of information represented by a solid or dashed line.

Configuration service—as described above.
   Validation service (optional)—as described above.
   Collection Request Service—as described above.
   Collection Status Service (inbound)—the Connector notifies the EMA that collected content is ready for download, that a collection is in progress, or it notifies of an error.
   Collection Reminder Request Service (optional)—as described above.
   Collection Reminder Status Service (inbound)—the Connector notifies the EMA that collected content is ready for download, that a collection is in progress, or it notifies of an error.
   Un-staging Service (optional)—as described above.
   Un-staging Status Service (optional)—the Connector notifies the EMA whether un-staging has been completed, that an error happened during un-staging, or that un-staging is in progress.

Note that this model allows for both EMA pulling content from the Connector and the Connector pushing content to EMA. Note also that the content which is to be downloaded should not necessarily reside in a Connector. The Connector can stage it in any location accessible by the EMA.

Bi-Directorial Hold Transactions

Figure 5:
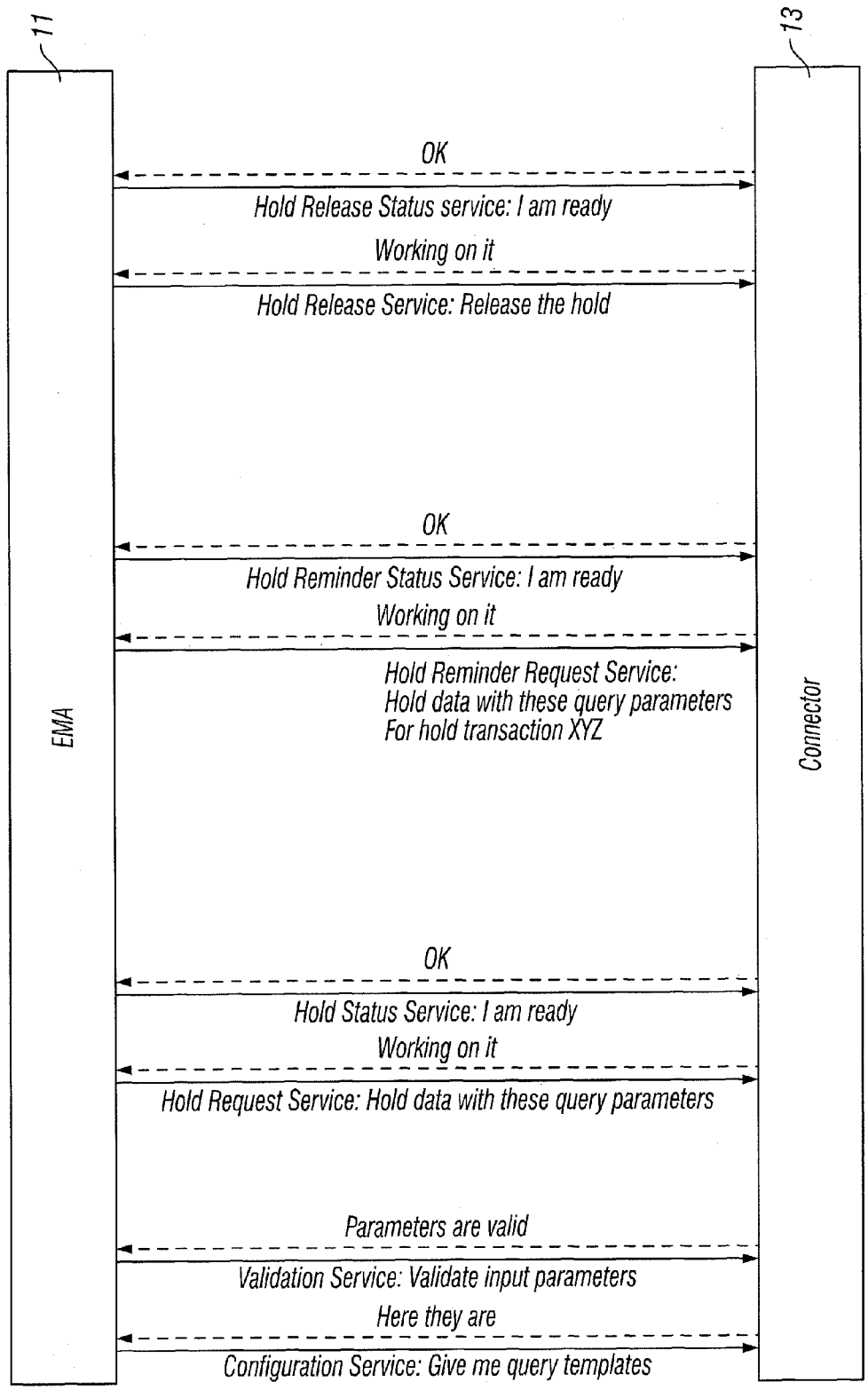
FIG. 5 is an architectural flow diagram of a bi-directorial hold communication according to the invention.

The following services are required for bi-directorial hold transactions. In particular, reference should be made to FIG. 5, which is an architectural flow diagram showing bi-directorial hold communication, in which process flow proceeds between the EMA 11 and the Connector 13 over time from left to right as indicated by the arrows on each exchange of information represented by a solid or dashed line.

Configuration service—as described above.
   Validation service (optional)—as described above.
   Hold Request Service—as described above.
   Hold Status Service (inbound)—The Connector notifies the EMA that the process of putting content on hold is completed, that it is in progress, or it notifies of an error.
   Hold Reminder Request Service (optional)—as described above.
   Hold Reminder Status Service (inbound)—the Connector notifies the EMA that the process of putting content on hold is completed, that it is in progress, or it notifies of an error.
   Hold Release Service (optional)—as described above.
   Hold. Release Status Service (optional)—the Connector notifies the EMA whether hold release has been completed, that an error happened during hold release, or that a hold release is in progress.

Note that the variety of services can be reduced, for example, by replacing all readiness services by a single "Is operation complete" service, or status services in bi-directorial model can be replaced by a single "Operation Status" inbound service. Also, reminder services can be replaced with "Request" services passing existing Collection/Hold transaction IDs. However, for ease of explanation these are described as separate services. In general, an implementation of a Hold or Collection transaction may deviate from the ones described above, but these models should be used as reference to understand the invention.

FEATURES OF A PRESENTLY PREFERRED EMBODIMENT

Data Type-Agnostic Automatic Collection

Various Data Sources require different sets of query parameters to identify the data targeted for a Collection or Hold. For example, an email archive may require a list of user mailboxes and a date range to produce a collection of emails, whereas a file system may require a root folder and last-modified date to produce files. Moreover, the same Data Source may require different sets of query parameters to produce data of different types, e.g. a Human Resource Management System may produce multiple reports, each requiring its own set of query criteria. Moreover, the same, Data Source may allow multiple sets of query parameters to produce documents of the same type. For example, files can be searched through simple and advanced searches. In these circumstances it becomes important for the EMA to configure itself dynamically, while letting the user fill in query parameters that are relevant to a Data Source chosen for Collection or Hold.

In the preferred embodiment, this task is solved through a Configuration Service that is available from the Connector and that responds to the EMA with a set of query templates, each template containing a number of query parameters. If there is more than one template, the EMA lets the user choose a query template. After that, the EMA dynamically generates a query parameter input form based upon query parameters specified in the chosen template. Then, the form is submitted to the Connector. In this way, the EMA becomes independent of the data type and query criteria or the Collection (Hold) that it orchestrates.

Collection/Hold Reuse

Query criteria filled in by the user when performing the Collection or Hold are saved by the EMA such that the user can search, either manually or automatically, through query criteria of existing Hold and Collection requests when the user needs to perform another hold or collection and determine whether there is a request that fully or partially satisfies the new query criteria.

Server Side Validation of the Dynamically Generated Collection (Hold) Query

When the user tries to submit the query to the EMA, the EMA may perform some validation on data in the query. For example, if the query contains a parameter of type "Date range," the EMA may check whether the start date in the range is earlier than the end date. However, pushing more sophisticated validation logic into the EMA quickly results in a very complex format of the Configuration service, buggy implementations on the EMA and Connector side, and other side effects. Accordingly, in the invention validation information is passed to the EMA, for example, as a part of Query Template. For example, the parameter "Name" may have an attribute "required-true" which indicates that the EMA should check that the user entered a name in the query template form.

Another limitation of validating queries in the EMA is the inability to validate based on dynamic criteria. For example, it is desirable to make sure that the user typed in an existing mailbox alias, and new mailboxes are added to the archive all the time.

To avoid these problems, the Connector provides a Validation Service where the Connector receives exactly the same query request as it uses to perform a Collection or Hold, and performs a deep validation of the request parameters, possibly using dynamic data stored inside the data source.

Eliminating Unnecessary Evidence After Performing the Collection

During the operation, a Connector could have created copies of data targeted for collection. If these copies survive the Collection transaction, they may become unwanted evidence from the EDiscovery viewpoint, and the user of the Data Source may have a legal obligation to collect or preserve these data in future litigation. To avoid this, one embodiment of the collection method suggests that the Connector disposes of the data staged for a Collection immediately after the content has been collected, once it receives an unstaging call.

Freezing the Set of Collected Content During a Collection Transaction

To ensure defensibility, the collection method suggests that all of the data matching query criteria found in the Data Source are preserved during the collection transaction. This can be done in different ways for different types of Data Sources. For example, for a file system Data Source the Connector may copy each file it found matching the query criteria into a special staging area before it proceeds with searching the rest of files so that users cannot delete these files before they are collected by the EMA. For a content management system, the Connector may lock the file it finds to prevent deletion of the file, and unlock the file after the collection is completed.

Using a Configuration Service to Communicate to the EMA the Subset of a Collection/Hold Transaction Supported by the Connector The Connector might not need to support the lowest common denominator set of services needed to complete a Collection or Hold transaction. For example, a Connector to a trading system in an investment bank may dynamically produce a user account status report in real time. Therefore, it does not require un-staging and un-staging readiness services to be implemented. The set of services implemented by the Connector can be communicated by the Connector to the EMA in response to a Configuration Service call so that the EMA does not call un-staging and un-staging readiness services after it completes a file download.

Collection of Content that has Previously been Put on Hold

A collection transaction may refer to a hold transaction instead of providing its own query parameters. In this way, the Connector collects all of the content that is currently on Hold within a given Hold transaction, or multiple Hold transactions. Optionally, the connector may perform a Hold reminder before responding to the Collection request to make sure that the latest data are put on hold.

Uni-Directorial/Bi-Directorial Communication Models

Figure 6:
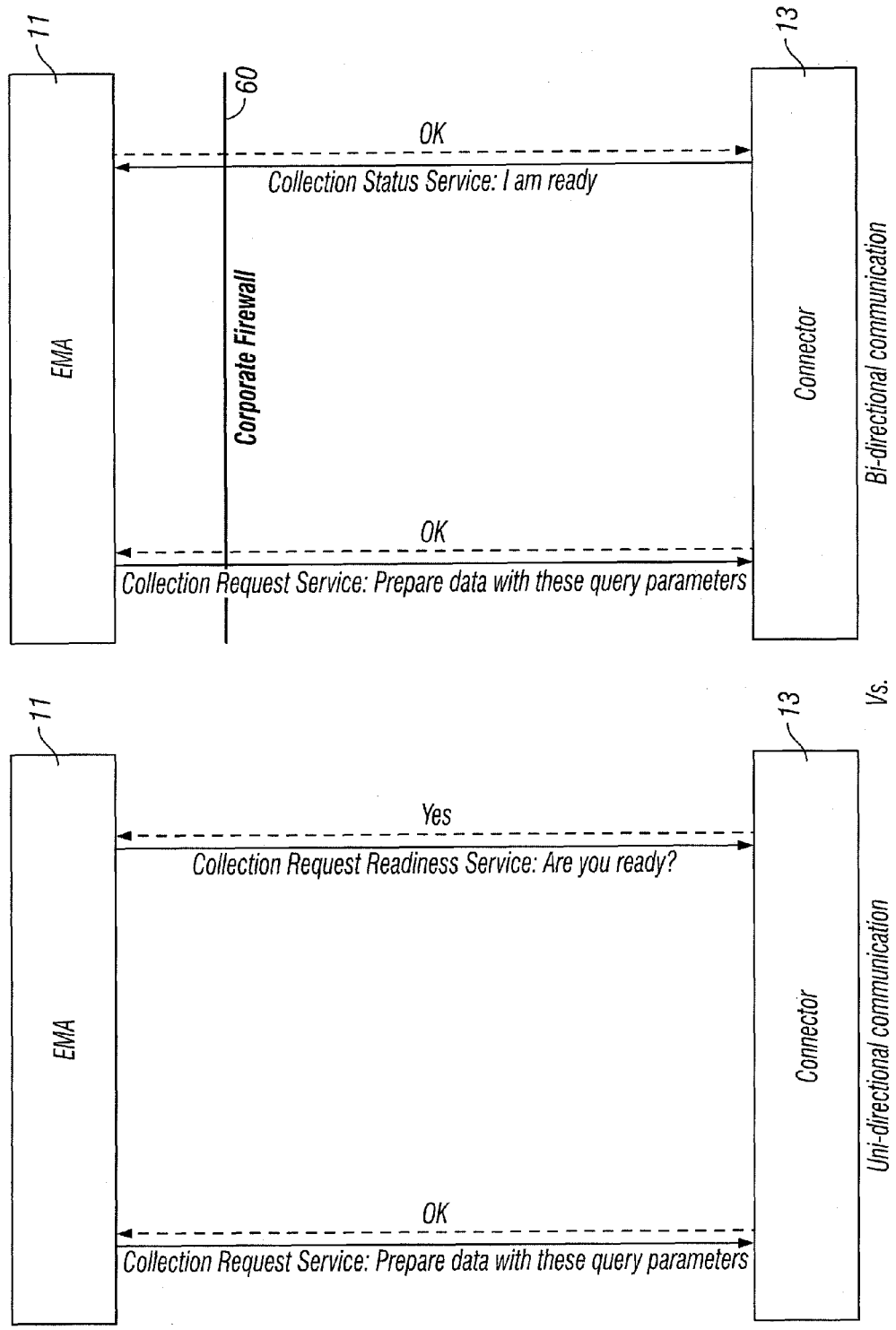
FIG. 6 is an architectural flow diagram that illustrates differences between uni-directorial and bi-directorial communication models according to the invention.

FIG. 6 is an architectural flow diagram that illustrates differences between uni-directorial and bi-directorial communication models according to the invention. FIG. 6 compares two embodiments of the invention, showing the benefit in some cases of implementing the communication model so that all service calls are initiated by EMA. This minimizes network setup work when the Connector resides outside the corporate firewall 60, and thus cannot initiate service calls to an EMA residing inside the firewall.

Collection Process with Reminders

FIG. 7 provides two flow charts showing the collection process with reminders (FIG. 7b) and the hold process with reminders (FIG. 7a) according to the invention.

Hold Reminder Services (FIG. 7a)

Hold requests can be continuous by nature. This means that if new data matching hold request query criteria has been added to the Data Source after the initial hold request has been executed, this data must be added to the hold. However, for many types of Data Sources it is hard to build a hold Connector that does this automatically. This is why the EMA can be designed so that it calls a Hold Reminder service of the Connector. Each time such service is called, it contains the identifier of the original hold transaction to which it belongs. This allows the connector to re-execute the search in the Data Source and add new data that fits the criteria to the existing hold.

Thus, the EMA performs the initial hold 70 and waits until it is time for a reminder 71. While waiting, the hold can be cancelled or released 72. Otherwise, the hold reminder is performed 73. Note that query criteria can be either recorded by the Connector during the original Hold Request Call or communicated by the EMA in each Hold Reminder request.

Collection Reminder Services (FIG. 7b)

A collection request can be continuous by nature when it is used for preservation. This means that if new data is added to the data source after the initial collection request has been executed, the new data must be collected by the EMA. However, in the uni-directorial communication model, the Connector cannot communicate newly found content back to the EMA. This is why EMA can be designed so that it calls the Collection Reminder services of the Connector. Each time such service is called it contains the identifier of the original collection transaction to which it belongs. This allows the Connector to re-execute the search in the Data Source and communicate newly found data to the EMA.

Thus, the EMA performs the initial collection 75 and waits until it is time to issue a reminder 76, while optionally collecting newly arrived content. While waiting, the collection can be cancelled or un-staged 77. Otherwise, the collection reminder is performed 78. Note that query criteria can be either recorded by the Connector during the original Collection Request Call or communicated by the EMA in each Collection Reminder request.

Asynchronous Handling of a Collection (Hold) Request

Figure 8B:
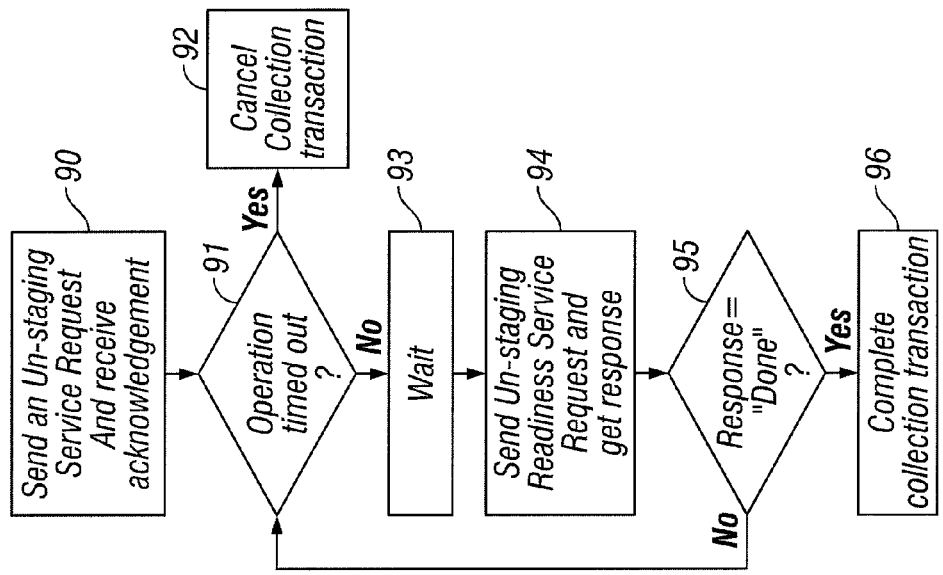
FIG. 8 provides two flow charts showing an asynchronous process in general (FIG. 8a) and use of an Un-Staging process in the collection transaction as a sample (FIG. 8b) according to the invention.
Figure 8A:
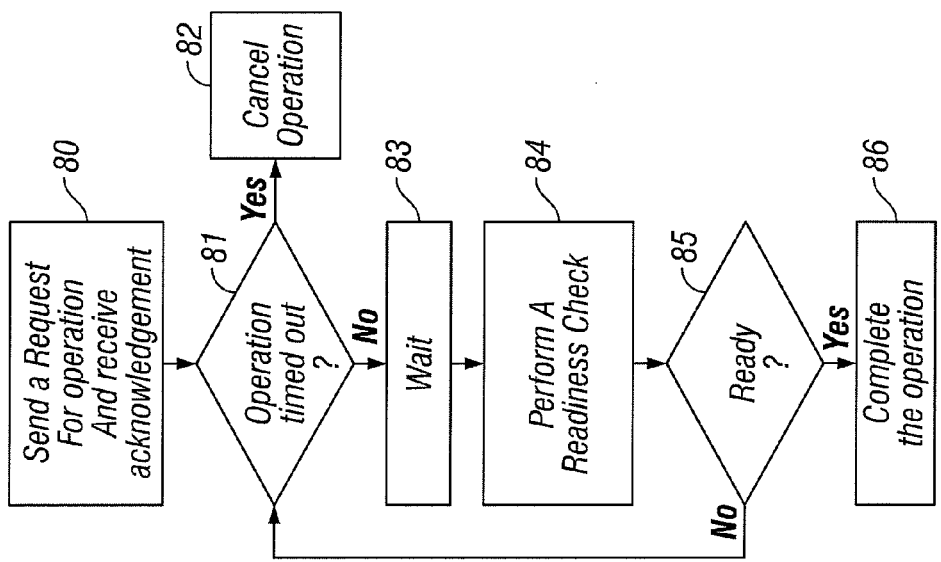

FIG. 8 provides two flow charts showing an asynchronous process in general (FIG. 8a) and use of an Un-Staging process in the collection transaction as a sample (FIG. 8b) according to the invention. Similar logic applies for all asynchronous processes, such as collection requests, hold requests, and hold releases.

It may take a substantial amount of time for a Connector to find the data that fits the query criteria during a collection or hold request or request reminder service call. It may take time for a connector to un-stage files or release the hold. To avoid communication timeouts, these operations can be performed by the Connector asynchronously. This means that the connector starts the process during the initial service call, e.g. a Collection Request Service call, and returns an acknowledgement in response. The operation readiness can be evaluated by the EMA, either through pinging the connectors for a readiness status, e.g. through a Collection Request Readiness Service call in a uni-directorial communication model, or by the Connector calling back to the EMA when the operation has been completed in a bi-directorial communication model.

The EMA may allow the Connector to choose whether to respond asynchronously or synchronously to a service request. To achieve this, the response to the request service should be of the same type as the response to the readiness service. For example, for both Collection Request and Collection Request Readiness services the response can be either acknowledgement ("Working on it"), or error ("collection request failed"), or it may be the payload, i.e. a list of collected files their URLs. In this way, fast connectors that do not need an asynchronous model can take advantage of the easier-to-implement synchronous option.

With regard to FIG. 8a, the EMA-side logic sends a request for an operation and receives an acknowledgement 80. If the operation times outs 81, the operation is cancelled 82. Else, the EMA-side logic waits 83 and then performs a readiness check 84. If the EMA-side logic is ready, the operation is completed 86; else, a determination is made whether the operation has timed out 81, i.e. the actual asynchronous business operation, such as collection or un-staging has timed out, and the process proceeds as discussed above.

With regard to FIG. 8b, the EMA-side logic sends an unstaging service request and receives an acknowledgement 90. If the operation times out 91, the collection transaction is cancelled 92. Else, the EMA-side logic waits 93 and then sends an un-staging readiness service request, to which it receives a response 94. If the response="Done" 95, the collection transaction is completed 96; else, a determination is made whether the operation has timed out 91 and the process proceeds as discussed above.

Figure 9:
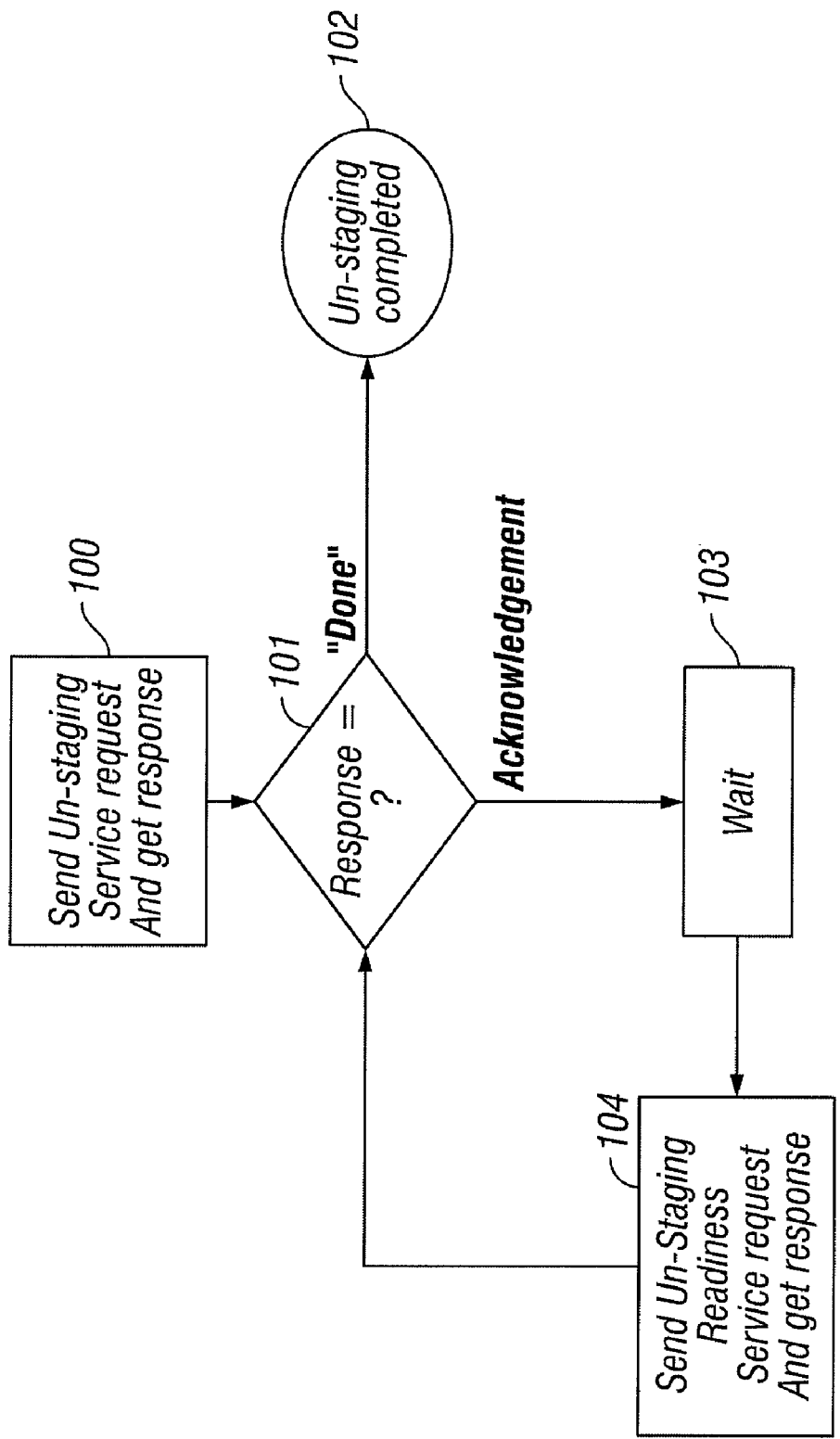
FIG. 9 is a flowchart showing the logic that supports both synchronous and asynchronous communication, for example during the un-staging process, according to the invention.

FIG. 9 is a flowchart showing the logic that supports both synchronous and asynchronous communication, for example during the un-staging process, according to the invention. In FIG. 9, the EMA-side logic sends an unstaging service request and the EMA-side logic waits to receive a response 100. If the Response="Done" 101, un-staging is completed 102; else, an acknowledgement is needed and the EMA-side logic waits 103. An un-staging readiness service request is sent and the EMA-side logic waits until a response is received 104, and the process continues as above.

Communication Through On-line Storage

Figure 10:
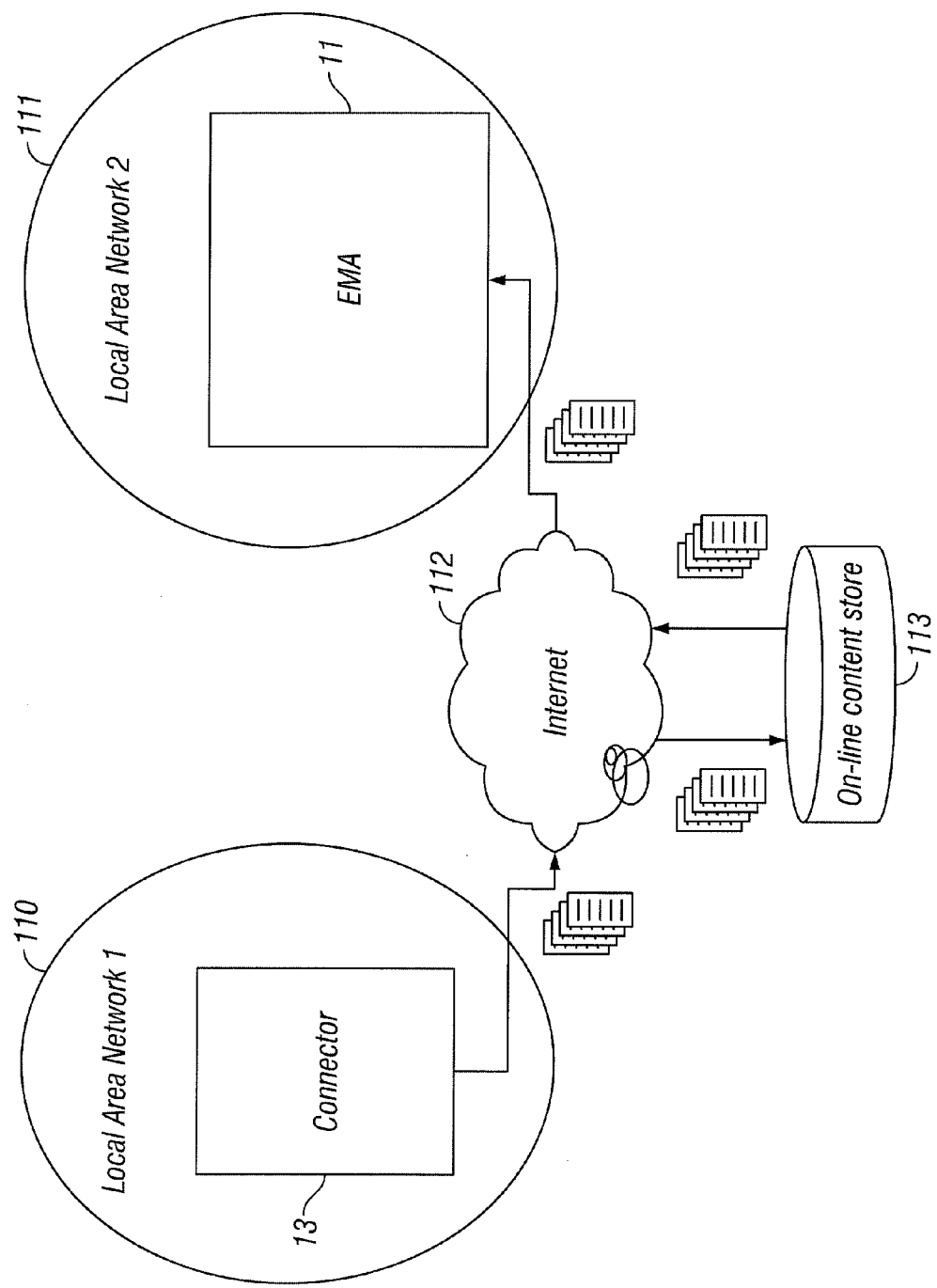
FIG. 10 is a block schematic diagram showing communication through on-line storage according to the invention.

FIG. 10 is block schematic diagram showing communication through an on-line storage medium, such as Amazon S3, or Nirvanix, according to the invention. In FIG. 10, the exchange of content is through an External On-line content store 113. The Connector may use an On-line data storage to communicate content between the Connector and the EMA. An example of such a storage is S3 hosted by Amazon. This also can be a locally hosted external on-line storage. In FIG. 10, the Connector resides in a first local area network 110 and the EMA resides in a second local area network 111. The Connector and EMA can communicate via a network, such as the Internet 112 with the on-line content store 113.

Sending Collected Content Directly to the EMA Data Store

Figure 11:
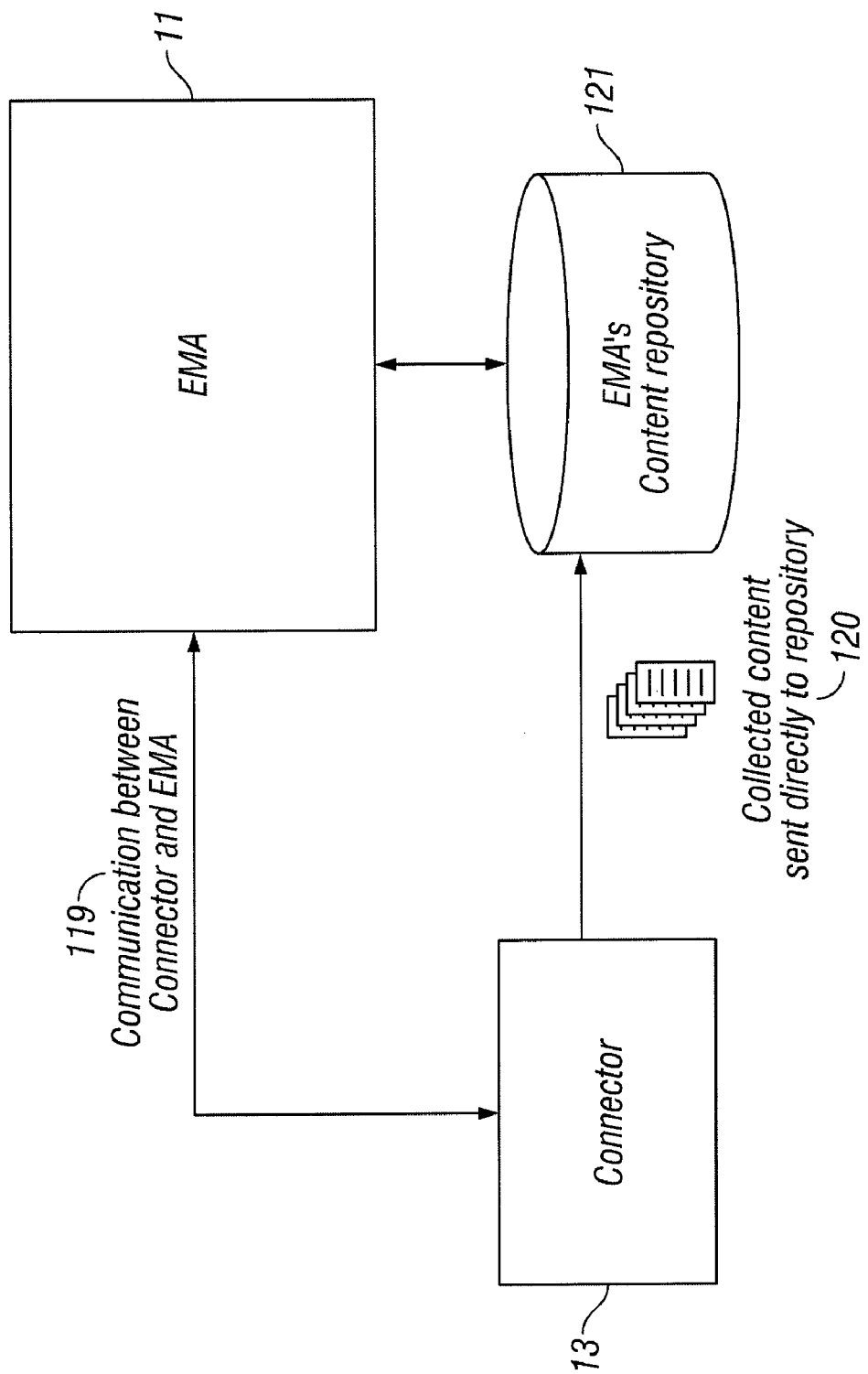
FIG. 11 is a block schematic diagram showing the sending of collected content directly to EMA data store according to the invention.

FIG. 11 is a block schematic diagram showing the sending of collected content directly to EMA data store according to the invention. This aspect of the invention allows an import directly to a final location. Instead of transmitting collected content from the Connector to the EMA, the Connector may stage the content directly into the EMA collection repository 121 via a direct path 120 and point the EMA to the content in the repository via a communication with the EMA 119.

Connector Limitations

FIG. 12 is a UI screen shot showing limitations of the connector implementation according to the invention. Some connectors may not fully implement the requirements described in a connector specification. For example, a connector to the file system may not be able to put on Hold the files that have been added and immediately deleted between two subsequent Hold Reminder requests. These limitations can be communicated to the EMA inside the response to a Configuration service and displayed by the EMA to a user so that the user becomes aware of these limitations and can act accordingly. Also, this information may be logged into the collection (hold) audit trail so other parties in litigation are aware of the technological limitations of the Connector.

UI Prompting for an Unsupported Hold

Figure 13B:
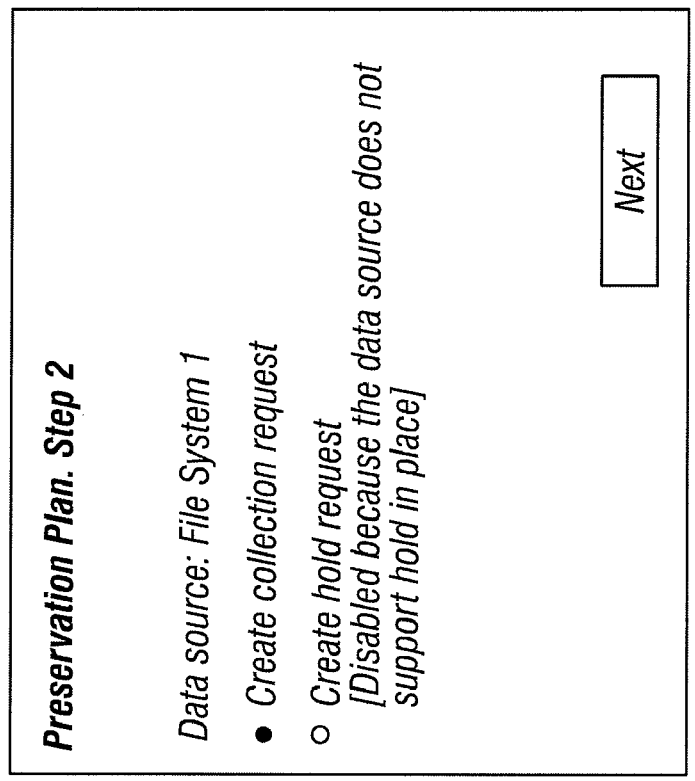
FIG. 13 provides two UI screen shots that show two steps (FIGS. 13a and 13b, respectively) in prompting that hold is not supported according to the invention.
Figure 13A:
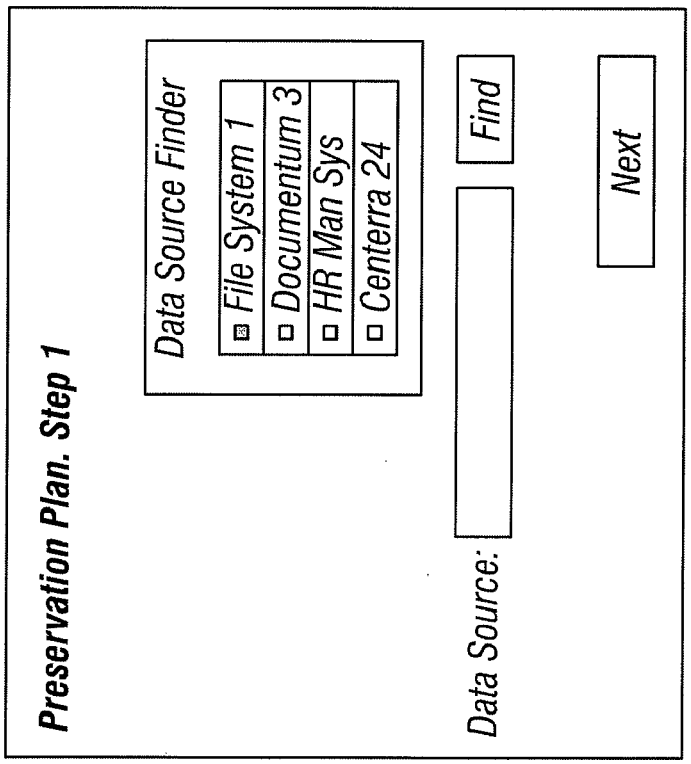

FIG. 13 provides two UI screen shots that show two steps (FIGS. 13a and 13b, respectively) in prompting that a hold is not supported, according to the invention. FIG. 13 is thus concerned with that aspect of the invention related to communication and interpretation of Data Source preservation capabilities.

Data Sources/Connectors can be classified according to their preservation capabilities in the following ways:

Those Data Sources/Connectors that do not need a hold request to preserve data because data is always preserved: Such data sources only require data to be collected for analysis and production purposes, thus their Connectors do not need to support Holds.

Those Data Sources/Connectors that require a hold request to preserve data: These data sources are issued Hold requests once the content needs to be preserved, and Collection requests when the content needs to be produced.

Those Data Sources/Connectors that cannot preserve data in place: Connectors to such Data Sources do not require to support Holds. Data are collected for both preservation and production purposes.

Connectors inform the EMA about their preservation capabilities through a Configuration Service. Based on this information, the EMA provides the user with proper preservation options. For example, if the user needs to preserve information in the data source that does not support Hold, the EMA may instruct the user to perform a collection for preservation.

FIG. 13 illustrates this aspect of the invention, where FIG. 13a shows a first step in which the user picks a data source file system which does not support a hold in place. At step 2, shown in FIG. 13b, the EMA does not allow the user to create a hold request, but only allows the creation of a collection request.

Service Ticket

FIG. 14 is a screen shot showing a sample. UI for a service ticket according to the invention. This aspect of the invention uses the automatic Collection and Hold infrastructure to communicate to a Technical Support Information System (TSIS) for manual Collections and Holds. Technical Support Information Systems are the systems that issue service tickets to service personnel (see FIG. 14). A ticket constitutes a task.

Collection and Hold Connectors may be implemented on top of the TSIS so that, once the Collection or Hold request service is called against the Connector, the Connector creates a Ticket in TSIS and fills the Ticket with the information coming from a Request Service.

Once the Collection or Hold task is executed by the person, the person changes the status of the Ticket, i.e. closes the ticket. This results in Connector changing the state to "Collection (Hold) Completed." The scenario assumes that the user may not need to use Connector to communicate collected files to EMA. Instead, the user can upload the collected files directly to the EMA. In this scenario, the Connector communicates to the EMA the information that files are uploaded to the EMA, or other content repository, outside the collection transaction so that the EMA does not need to initiate a file download.

BENEFITS AND IMPROVEMENTS

When compared to manual collections and holds, automatic collections and holds require the involvement of less personnel and thus provide employee cost savings. Further, when compared to manual collections and holds, automatic collections and holds minimize the chance that collection and hold instructions are misinterpreted during transmission. Increased collection transparency reduces the risk that a mistake made by an employee remains unnoticed during the collection process. Automatic collection and hold transactions also ensure a clear audit trail, thus making the legal hold process more defensible.

As opposed to collecting documents in an ad-hoc fashion, e.g. using whatever existing protocol is available, the preferred embodiment of the invention allows use of the same collection/hold programming logic across Data Sources that have very different characteristics, such as different latency in document search. This drives down the costs of development and quality assurance on both the EMA and Data Source sides. As opposed to collecting documents in an ad-hoc fashion, the preferred embodiment also guarantees that, once the files are identified for collection, they are collected, thus achieving better defensibility of the collection process.

The preferred embodiment of the invention allows the EMA to be agnostic to different types of documents that are supposed to be collected and to query parameters that are expected by different data sources, to collect different types of documents. This drives down the cost of the EMA-side implementation. The preferred embodiment also allows the EMA to derive different application logic, depending on different preservation capabilities exposed by a data source. Further, the preferred embodiment allows EMA users to minimize collection costs by re-using existing collections.

The preferred embodiment of the invention also allows for sophisticated validation of collection/hold request query parameters, thus avoiding wasted time and effort due to a Collection/Hold request failing on a later stage, and thus speeding up the Collection/Hold operation.

The preferred embodiment allows integration with Ticketing Systems using the same mechanism as integration with automated Data Sources.

The preferred embodiment also recognizes the continuous nature of a legal hold and provides mechanisms to update the set of documents that are put on hold or the set of documents that are collected for preservation, thus making such an implementation more accurate and defensible.

The preferred embodiment allows for communication between the EMA and data sources located outside the corporate firewall because it performs all the communication using outbound service calls.

Finally, but not by way of limitation, the preferred embodiment provides a mechanism for communicating the limitations of a connector implementation to a user who administers the collection.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An electronic discovery apparatus for communicating both electronic discovery collection requests, in which data are collected from one or more data sources, and hold requests, in which one or more data sources are instructed to preserve certain data, in connection with discovery of electronically stored evidence, comprising:
   a plurality of data sources comprising said electronically stored evidence;
   a hardware connector comprising an interface and a plurality of services for performing operations on said data sources; and
   an electronic discovery management application (EMA) embodied in a hardware module for managing collections and holds, said EMA communicating with said data sources via said connector by calling said connector services, wherein said EMA communicates collection and hold requests to said data sources, and collects said electronically stored evidence from said data sources, said EMA further comprising any of a uni-directorial communications module and a bi-directorial communications module, with which all service calls are initiated by said EMA, and with which said connector only responds to service calls from said EMA, said uni-directorial module further comprising:
      a configuration service, wherein when said EMA requests configuration information from said connector, said information comprises at least one in a group consisting of query templates, information on a subset of services supported by said connector, information on versions of services supported by said connector, information on preservation capabilities of a data source or connector, and information of limitations on said connector implementation;
      an optional validation service, wherein said EMA sends proposed values of query parameters to said connector, and said connector validates these parameters and replies with error description when said parameter values are invalid;
      a collection request service, wherein said EMA instructs said connector to start a collection based upon provided query parameters, and wherein said connector responds with acknowledgement, collection information, or an error message;
      an optional collection request readiness service, wherein said EMA checks whether said connector is ready with said electronically stored evidence to download, and wherein said connector responds with acknowledgement, collection information, or an error message;
      an optional collection reminder request service, wherein said EMA instructs said connector to update an existing collection with newly arrived electronically stored evidence, and wherein said connector responds with acknowledgement, collection information or an error message;
      an optional collection reminder request readiness service, wherein said EMA checks whether said connector is ready with said electronically stored evidence to download, and wherein said connector responds with acknowledgement, collection information, or an error message;
      an un-staging service wherein, once said EMA has downloaded collected electronically stored evidence, said EMA calls said un-staging service to indicate that said connector disposes of transient information needed to perform a collection transaction, wherein said transient information only persists for a predetermined time period, and wherein said connector responds with acknowledgement, completion message, or an error message; and an optional un-staging readiness service, wherein said EMA checks whether said connector has finished an un-staging process, and wherein said connector responds with acknowledgement, completion message, or an error message.

2. The apparatus of claim 1, said data sources each comprising any of:

a file system containing individual document files;
a content management system;
a transactional data driven application;
an email server; and
an email archive.

3. The apparatus of claim 1, wherein said connector services comprise any of Web Services, structured hypertext transfer protocol ("HTTP") requests, and local or remote procedure calls.

4. The apparatus of claim 1, wherein said bi-directional module further comprising:

a configuration service, wherein when said EMA requests configuration information from said connector, said information comprises at least one in said group consisting of query templates, information on a subset of services supported by said connector, information on versions of services supported by said connector, information on preservation capabilities of a data source or connector, and information of limitations on said connector implementation;

an optional validation service, wherein said EMA sends proposed values of query parameters to said connector, and said connector validates these parameters and replies with error description when said parameter values are invalid;

a collection request service, wherein said EMA instructs said connector to start a collection based upon provided query parameters, and wherein said connector responds with acknowledgement, collection information, or an error message;

an inbound collection status service, wherein said connector notifies said EMA that collected electronically stored evidence is ready for download, or collection is in progress, or notifies of an error;

an optional collection reminder request service, wherein said EMA instructs said connector to update an existing collection with newly arrived electronically stored evidence, and wherein said connector responds with acknowledgement, collection information or an error message;

an inbound collection reminder status service, wherein said connector notifies said EMA that collected electronically stored evidence is ready for download, or collection is in progress, or notifies of an error;

an optional un-staging service wherein, once said EMA has downloaded collected electronically stored evidence, said EMA calls said un-staging service to indicate that said connector disposes of transient information needed to perform a collection transaction, wherein said transient information only persists for a predetermined time period, and wherein said connector responds with acknowledgement, completion message, or an error message; and an optional un-staging status service, wherein said connector notifies said EMA whether un-staging has been completed, error happened during un-staging, or un-staging is in progress.

5. The apparatus of claim 1, wherein said bi-directorial module further comprising:

a configuration service, wherein when said EMA requests configuration information from said connector, said information comprises at least one in said group consisting of query templates, information on a subset of services supported by said connector, information on versions of services supported by said connector, information on preservation capabilities of a data source or connector, and information of limitations on said connector implementation;

an optional validation service, wherein said EMA sends proposed values of query parameters to said connector, and said connector validates these parameters and replies with error description when said parameter values are invalid;

a hold request service, wherein said EMA instructs said connector to start a hold based upon provided query parameters, and wherein said connector responds with acknowledgement, hold information, or an error message;

an inbound hold status service, wherein said connector notifies said EMA that a process of putting electronically stored evidence on hold is completed, or it is in progress, or notifies of an error;

an optional hold reminder request service, wherein said EMA instructs said connector to update an existing hold with newly arrived electronically stored evidence matching query criteria, and wherein said connector responds with acknowledgement, hold information, or an error message;

an inbound hold reminder status service, wherein said connector notifies said EMA that a process of putting electronically stored evidence on hold is completed, or it is in progress, or notifies of an error;

an optional hold release service wherein, when a hold is not needed any more, said EMA calls said hold release service to indicate that said connector releases said electronically stored evidence on hold, and wherein said connector starts a hold release process and responds with acknowledgement, a completion message, or an error message; and an optional hold release status service, wherein said connector notifies said EMA whether a hold release has been completed, an error happened during hold release, or a hold release is in progress.

6. The apparatus of claim 1, further comprising:

a configuration service, available from said connector, that responds to said EMA with a set of query templates, each template containing a number of query parameters;

wherein if there is more than one template, said EMA lets a user choose a query template, after which said EMA dynamically generates a query parameter input form based upon query parameters specified in a chosen template, after which said form is submitted to said connector;

wherein said EMA becomes independent of a data type and query criteria or a collection or hold that said EMA orchestrates.

7. The apparatus of claim 1, further comprising:

a storage associated with said EMA for saving query criteria filled in by a user when performing a collection or hold transaction;

wherein said user can search, either manually or automatically, through query criteria of existing hold and collection requests when said user needs to perform another hold or collection transaction and determine whether there is a request that fully or partially satisfies new query criteria.

8. The apparatus of claim 1, further comprising:
means associated with said EMA for performing validation of a dynamically generated collection or hold query;
wherein when a user submits a query to said EMA, said EMA performs a validation on data in said query.

9. The apparatus of claim 1, further comprising:
a validation service associated with said connection, wherein said connector receives exactly a same query request as it uses to perform a collection or hold, and performs a deep validation of request parameters, optionally using dynamic data stored inside said data source.

10. The apparatus of claim 1, further comprising:
means for eliminating unnecessary evidence after performing a collection;
wherein said connector disposes of data staged for a collection immediately after said electronically stored evidence has been collected, once it receives an un-staging call.

11. The apparatus of claim 1, further comprising:
means for freezing a set of collected electronically stored evidence during a collection transaction;
wherein, for a file system data source, said connector copies each file it found matching a query criteria into a special staging area before it proceeds with searching a remainder of files so that users cannot delete these files before they are collected by said EMA and, for a content management system, said connector locks a file it finds to prevent deletion of said file, and unlocks said file after a collection is completed.

12. The apparatus of claim 1, further comprising:
a configuration service for communicating to said EMA a subset of a collection or hold transaction that is supported by said connector in response to a configuration service call by said EMA.

13. The apparatus of claim 1, further comprising:
means for collecting electronically stored evidence that has previously been put on hold;
wherein said connector collects all of said electronically stored evidence that is currently on hold within a given hold transaction, or multiple hold transactions; and
wherein said connector optionally performs a hold reminder before responding to a collection request to make sure that most recent data are put on hold.

14. The apparatus of claim 1, further comprising:
any of hold and collection reminder services;
said hold reminder service comprising:
means associated with said EMA for calling a hold reminder service of said connector;
wherein each time said hold reminder service is called, it contains an identifier of an original hold transaction to which it belongs;
wherein said connector re-executes a search in said data source and adds new data that fits said search criteria to an existing hold;
wherein said EMA performs an initial hold and waits until it is time for a reminder;
wherein while waiting, said hold is optionally cancelled or released; otherwise, said hold reminder is performed; and wherein said query criteria is optionally either recorded by said connector during an original hold request call or communicated by said EMA in each hold reminder request;
said collection reminder service comprising:
means associated with said EMA for calling a collection reminder service of said connector;
wherein each time said collection reminder service is called it contains an identifier of an original collection transaction to which it belongs;
wherein said connector re-executes a search in said data source and communicates newly found data to said EMA;
wherein said EMA performs an initial collection and waits until it is time to issue a reminder, while optionally collecting newly arrived electronically stored evidence;
wherein, while waiting, said collection is optionally cancelled or un-staged, otherwise, a collection reminder is performed;
wherein query criteria is optionally either recorded by said connector during an original collection request call or communicated by said EMA in each collection reminder request.

15. The apparatus of claim 1 t further comprising:
means for asynchronous handling of a collection or hold request to avoid communication timeouts, by performing collection or hold request operations with said connector asynchronously;
wherein said connector starts a process during an initial collection request service call, and returns an acknowledgement in response;
wherein operation readiness is evaluated by said EMA, either through pinging said connector for a readiness status through a collection request readiness service call in a uni-directorial communication model or by said connector calling back to said EMA when said operation has been completed in bi-directorial communication model.

16. The apparatus of claim 15, wherein said EMA comprises:
means for allowing said connector to choose whether to respond asynchronously or synchronously to a service request;
wherein a response to a request service is of a same type as a response to a readiness service.

17. The apparatus of claim 1, further comprising:
an external online storage;
means associated with said connector for communicating with said external online content store;
wherein said connector uses said online data storage to communicate electronically stored evidence between said connector and said EMA.

18. The apparatus of claim 1, further comprising:
means for sending collected electronically stored evidence directly to said EMA data store;
wherein said connector stages said electronically stored evidence directly into an EMA collection repository via a direct path and points said EMA to said electronically stored evidence in said repository via a communication with said EMA.

19. The apparatus of claim 1, further comprising:
a user interface element for communicating limitations of a connector implementation to said EMA inside a response to a configuration service and for display by said EMA to a user, wherein said user is made aware of said limitations and can act accordingly; and optional means for logging said limitations into a collection or hold audit trail so other parties are aware of said connector limitations.

20. The apparatus of claim 1, further comprising:
a configuration service through which at least one connector provides said EMA with information about its preservation capabilities;
wherein, based on said information, said EMA provides a user with proper preservation options.

21. The apparatus of claim 20, wherein data sources or connectors are classified according to their preservation capabilities, and provide information to said EMA on following basis:
those data sources or connectors that do not need a hold request to preserve data because data is always preserved;
those data sources/connectors that require a hold request to preserve data; and
those data sources/connectors that cannot preserve data in place.

22. The apparatus of claim 1, further comprising:
a technical support information system (TSIS),
wherein said connector instructs said TSIS to issue a ticket when said connector receives a collection or hold request from said EMA;
wherein said TSIS creates a ticket and assigns said ticket to a technical support employee, wherein instructions in said ticket are copied over from said EMA's query parameters;
wherein said technical support employee sees said ticket in a form of a task;
wherein said technical support employee performs said task and sets said ticket status inside said TSIS to closed;
wherein, when said connector receives a subsequent readiness call, said connector checks whether said ticket status is closed, in which case said connector responds to said EMA with a completion, otherwise, said connector responds with an acknowledgement.

23. The apparatus of claim 1, said evidence being discovered in connection with any of civil litigation, tax, government investigation, and criminal proceedings.

24. An electronic discovery apparatus for communicating both electronic discovery collection requests, in which data are collected from one or more data sources, and hold requests, in which one or more data sources are instructed to preserve certain data, in connection with discovery of electronically stored evidence, comprising:
a plurality of data sources comprising said electronically stored evidence;
a hardware connector comprising an interface and a plurality of services for performing operations on said data sources; and
an electronic discovery management application (EMA) embodied in a hardware module for managing collections and holds, said EMA communicating with said data sources via said connector by calling said connector services, wherein said EMA communicates collection and hold requests to said data sources, and collects said electronically stored evidence from said data sources, said EMA further comprising a uni-directorial communications module, with which all service calls are initiated by said EMA, and with which said connector only responds to service calls from said EMA, said uni-directorial module further comprising:
a configuration service, wherein when said EMA requests configuration information from said connector, said information comprises at least one in a group consisting of query templates, information on a subset of services supported by said connector, information on versions of services supported by said connector, information on preservation capabilities of a data source or connector, and information of limitations on said connector implementation;
an optional validation service, wherein said EMA sends proposed values of query parameters to said connector, and said connector validates these parameters and replies with error description when said parameter values are invalid;
a hold request service, wherein said EMA instructs said connector to start a hold based upon provided query parameters, and wherein said connector responds with acknowledgement, hold information, or an error message;
an optional hold request readiness service, wherein said EMA checks whether said connector completed performing a hold, and wherein said connector responds with acknowledgement, hold information, or an error message;
an optional hold reminder request service, wherein said EMA instructs said connector to update an existing hold with newly arrived electronically stored evidence matching query criteria, and wherein said connector responds with acknowledgement, hold information, or an error message;
an optional hold reminder request readiness service, wherein said EMA checks whether said connector completed executing a hold reminder request, and wherein said connector responds with acknowledgement, hold information, or an error message;
a hold release service wherein, when a hold is not needed any more, said EMA calls said hold release service to indicate that said connector releases said electronically stored evidence on hold, and wherein said connector starts a hold release process and responds with acknowledgement, a completion message, or an error message; and
an optional hold release readiness service, wherein said EMA checks whether said connector has finished a hold release process, and wherein said connector responds with acknowledgement, a completion message, or an error message.

25. An electronic discovery apparatus for communicating both electronic discovery collection requests, in which data are collected from one or more data sources, and hold requests, in which one or more data sources are instructed to preserve certain data, in connection with discovery of electronically stored evidence, comprising:
a plurality of data sources comprising said electronically stored evidence;
a hardware connector comprising an interface and a plurality of services for performing operations on said data sources; and
an electronic management application (EMA) embodied in a hardware module for managing collections and holds, said EMA communicating with said data sources via said connector by calling said connector services,
wherein said EMA communicates collection and hold requests to said data sources, and collects said electronically stored evidence from said data sources, said EMA further comprising a bi-directorial communications module, with which said connector can both initiate service calls to said EMA and respond to service calls from said EMA, said bi-directorial module further comprising:

a configuration service, wherein when said EMA requests configuration information from said connector, said information comprises at least one in a group consisting of query templates, information on a subset of services supported by said connector, information on versions of services supported by said connector, information on preservation capabilities of a data source or connector, and information of limitations on said connector implementation;

an optional validation service, wherein said EMA sends proposed values of query parameters to said connector, and said connector validates these parameters and replies with error description when said parameter values are invalid;

a collection request service, wherein said EMA instructs said connector to start a collection based upon provided query parameters, and wherein said connector responds with acknowledgement, collection information, or an error message;

an inbound collection status service, wherein said connector notifies said EMA that collected electronically stored evidence is ready for download, or collection is in progress, or notifies of an error;

an optional collection reminder request service, wherein said EMA instructs said connector to update an existing collection with newly arrived electronically stored evidence, and wherein said connector responds with acknowledgement, collection information or an error message;

an inbound collection reminder status service, wherein said connector notifies said EMA that collected electronically stored evidence is ready for download, or collection is in progress, or notifies of an error;

an optional un-staging service wherein, once said EMA has downloaded collected electronically stored evidence, said EMA calls said un-staging service to indicate that said connector disposes of transient information needed to perform a collection transaction, wherein said transient information only persists for a predetermined time period, and wherein said connector responds with acknowledgement, completion message, or an error message; and an optional un-staging status service, wherein said connector notifies said EMA whether un-staging has been completed, error happened during un-staging, or un-staging is in progress.

26. An electronic discovery apparatus for communicating both electronic discovery collection requests, in which data are collected from one or more data sources, and hold requests, in which one or more data sources are instructed to preserve certain data, in connection with discovery of electronically stored evidence, comprising:

a plurality of data sources comprising said electronically stored evidence;

a hardware connector comprising an interface and a plurality of services for performing operations on said data sources; and an electronic discovery management application (EMA) embodied in a hardware module for managing collections and holds, said EMA communicating with said data sources via said connector by calling said connector services, wherein said EMA communicates collection and hold requests to said data sources, and collects said electronically stored evidence from said data sources, said EMA further comprising a bi-directorial communications module, with which said connector can both initiate service calls to said EMA and respond to service calls from said EMA, said bi-directorial module further comprising:

a configuration service, wherein when said EMA requests configuration information from said connector, said information comprises at least one in a group consisting of query templates, information on a subset of services supported by said connector, information on versions of services supported by said connector, information on preservation capabilities of a data source or connector, and information of limitations on said connector implementation;

an optional validation service, wherein said EMA sends proposed values of query parameters to said connector, and said connector validates these parameters and replies with error description when said parameter values are invalid;

a hold request service, wherein said EMA instructs said connector to start a hold based upon provided query parameters, and wherein said connector responds with acknowledgement, hold information, or an error message;

an inbound hold status service, wherein said connector notifies said EMA that a process of putting electronically stored evidence on hold is completed, or it is in progress, or notifies of an error;

an optional hold reminder request service, wherein said EMA instructs said connector to update an existing hold with newly arrived electronically stored evidence matching query criteria, and wherein said connector responds with acknowledgement, hold information, or an error message;

an inbound hold reminder status service, wherein said connector notifies said EMA that a process of putting electronically stored evidence on hold is completed, or it is in progress, or notifies of an error;

an optional hold release service wherein, when a hold is not needed any more, said EMA calls said hold release service to indicate that said connector releases said electronically stored evidence on hold, and wherein said connector starts a hold release process and responds with acknowledgement, a completion message, or an error message; and an optional hold release status service, wherein said connector notifies said EMA whether a hold release has been completed, an error happened during hold release, or a hold release is in progress.

\* \* \* \* \*